United States Patent [19]
Kobler et al.

[11] Patent Number: 6,055,842
[45] Date of Patent: May 2, 2000

[54] METHOD FOR CALIBRATING ROTATING TOOLS

[75] Inventors: Karl Kobler, Mattighofen, Austria; Hanifi Malcok, Burghausen; Hermann Zwirglmaier, Teising, both of Germany

[73] Assignee: Wacker Siltronic Gesellschaft für Halbleitermaterialien AG, Burghausen, Germany

[21] Appl. No.: 09/122,462

[22] Filed: Jul. 24, 1998

[30] Foreign Application Priority Data

Aug. 8, 1997 [DE] Germany .................. 197 34 469

[51] Int. Cl.[7] ........................................ H04N 7/18
[52] U.S. Cl. ................................................ 73/1.79
[58] Field of Search .......................... 73/1.01, 1.79, 73/104, 1.37, 1.41

[56] References Cited

U.S. PATENT DOCUMENTS

| | | |
|---|---|---|
| 3,039,235 | 6/1962 | Heinrich et al. . |
| 3,175,548 | 3/1965 | Weiss . |
| 3,681,978 | 8/1972 | Mathias et al. . |
| 4,763,533 | 8/1988 | Uitermarkt ................... 73/1.79 |
| 4,942,611 | 7/1990 | Kunugi et al. . |
| 5,642,159 | 6/1997 | Oba ............................. 73/104 |

FOREIGN PATENT DOCUMENTS

| | | |
|---|---|---|
| 0708391 | 10/1995 | European Pat. Off. . |
| 2841653 | 6/1982 | Germany . |
| 3442730 | 8/1986 | Germany . |
| 3821412 | 1/1989 | Germany . |

OTHER PUBLICATIONS

Derwent Abstract Corresponding to DE 34 42730, Aug. 1986.

Derwent Abstract Corresponding to DE 28 41 653, Sep. 1982.

*Primary Examiner*—Robert Raevis
*Attorney, Agent, or Firm*—Collard & Roe, P.C.

[57] ABSTRACT

A method for monitoring the calibration of and calibrating rotating tools which are liable to deviate, wherein at least one known deviation is recorded at a first predetermined rotational speed. The method can be used with annular saws that divide workpieces into semiconductor wafers.

6 Claims, No Drawings

METHOD FOR CALIBRATING ROTATING TOOLS

BACKGROUND OF THE INVENTION

1. Field of the Invention

The invention relates to a method for calibrating rotating tools which are liable to deviate.

2. The Prior Art

Machine tools which have rotating tools and use displacement measurement sensors have been calibrated by setting an initial value between sensor and tool. The initial value serves as the basis for the zero adjustment, which is performed prior to each operating step, between the desired and actual positions. This initial value was measured using a measurement instrument, such as a micrometer screw. This is used particularly for milling machines, lathes and annular saws. For annular saws, the saw blade had to be removed in order to check or calibrate the displacement measurement system. However, this is generally carried out once a month. If the calibration of the displacement measurement system changed in the intervening period, the objects cut with the saw blade were cut incorrectly until calibration was carried out once again.

SUMMARY OF THE INVENTION

It is an object of the present invention to provide a simple and rapid method for monitoring the calibration of and for calibrating machine tools which have rotating tools.

The above object is achieved by the present invention which relates to a method for monitoring the calibration of and for calibrating rotating tools which are liable to deviate, wherein at least one known deviation is recorded at a predetermined rotational speed.

There are many machine tools which have rotating tools which are subject to a known deviation, such as milling. machines, lathes, grinding machines and annular saws. The present invention is described for annular saws. However, it may be applied to all machine tools which have rotating tools.

To precisely divide bar-shaped workpieces into wafers, annular saws are generally used. The workpiece can be made of glass, quartz, ceramic or oxide material, such as ruby or gallium-gadolinium garnet, but also compound or elemental semiconductor materials, for example gallium arsenide or indium phosphide, and in particular silicon or germanium. Annular saws meet the strict demands placed on the geometric quality of the products obtained in a particularly successful manner. Saw blades used are circular thin sheet-metal discs which have a central circular bore which is an internal hole, concentric with respect to the outer circumference. The circumferential area of this hole is provided with a cutting surface, which generally comprises grains of hard material embedded in a bonding matrix. For example, cutting surfaces have a cross section in the shape of a drop. They consist of grains of diamonds or boron nitride embedded in a metal matrix, preferably a nickel matrix, and are suitable for sawing bars of semiconductor material. For example, silicon can be sawed into thin wafers of a thickness of about 0.1 to 1 mm which are useful in the production of electronic or power components.

The outer circumference of the saw blade is clamped into a clamping system which may, for example, be designed as described in DE-C 34 42 730, U.S. Pat. No. 3,175,548, U.S. Pat. No. 3,039,235 or DE-C 28 41 653. This clamping system is placed on the sawing machine rotor, which is generally widened in the form of a cup, in a position which is coaxial and rotationally symmetrical.

The workpiece to be sawed, e.g. a silicon bar, is generally fixed in the tool mount by means of an adaptor device. It is moved into the planned cutting position by means, of a feed mechanism and is held in this position.

During the sawing operation, the rotating saw blade and the workpiece are subjected to a relative movement. This movement causes the cutting edge to work radially through the workpiece until the desired wafer has finally been severed. In known annular saws, numerous variants are used for this purpose. For example, the workpiece executes the cutting movement while the saw blade remains in a fixed position. Alternatively, the saw blade is moved through the workpiece, which is held in a fixed position. It is possible for the workpiece to be held in both a horizontal and a vertical position, with the saw blade correspondingly clamped in a vertical or horizontal position.

However, in each of the abovementioned variants, in addition to the radially directed main cutting force during the separating operation, additional forces may exist. These additional forces which are directed axially, i.e. perpendicular to the plane of the saw blade, affect its movement in the workpiece. These additional forces may cause deviations from the desired cutting line. Possible causes are, for example, irregularities in the cutting surface, such as uneven abrasion, different cutting-grain densities in the surface, irregular cutting-grain geometries or differing deposition of abrasive material on the cutting edge. Also, there are irregular pressure ratios in the saw blade or movements of the workpiece or of the saw machine rotor.

This deviation of the saw blade causes the wafer product obtained to deviate from the shape which is actually desired. If the saw blade in two successive sawing operations deviates from the ideal position by the same amount and in the same direction each time, the surfaces of a wafer which are produced by these two cuts are not ideally planar. Instead, these surfaces will have a parallel curvature. Although there is no variation in the thickness of the wafer, the wafer does have a so-called "warp", or a curvature. If the deviations are in opposite direction, wafers with a variation in thickness will be produced. Standardized test methods have been developed for characterizing the wafers with regard to such errors of geometry. For example, the method in accordance with ASTM standard F 657–80 can be used to determine the values of the "warp" and/or "bow" of a wafer. According to this standard, perfect wafers may deviate from a predetermined desired geometry only within narrow tolerance limits. This applies to semiconductor wafers for use in the production of electronic, in particular large-scale-integrated components. This also applies to wafers for use primarily in photolithographic processes, in which particularly high demands are placed on the geometric accuracy.

This is achieved by a method which changes the relative position of the workpiece and of the saw-blade clamping plane. This clamping plane is an imaginary plane occupied by the clamping edge of the clamping system. This change in the relative position of the clamping plane and of the workpiece with respect to one another is in the axial direction, with the axis of rotation of the clamping system as a reference axis. This change occurs in a controlled manner, until the actual position at the cutting location deviates from the desired position at most by a permissible tolerance limit value.

The translational axial relative movement can be achieved by tracking the workpiece, by tracking the saw blade or by a combination of these two tracking movements. In most cases, it is sufficient to use one of the two alternative possibilities. Thus, there is no need to employ the combination tracking, which is more expensive in terms of control engineering and apparatus.

Any type of tracking requires sufficiently strong clamping of the workpiece, in order to minimize the play which arises during the sawing operation. This requirement is satisfactorily fulfilled by using standard worktables. This is because a workpiece position which is accurate and has a minimum variation is essential also in conventional annular sawing processes.

Furthermore, extremely accurate recording of the cutting progress is necessary. This means that an extremely accurate observation of the movement of the cutting edge through the workpiece or of the deviation of the saw blade during the cutting operation is required. This is an important prerequisite for carrying out the method according to the invention. Measurement sensor devices which can be used to determine the respective actual position of the rotating saw blade in the workpiece are known. These devices can be employed in the method, as long as they allow sufficiently accurate measurement. Suitable measurement sensors include those which allow the respective actual position to be recorded directly. This means that the measurement signal is generated through the wafer being produced. Suitable measurement sensors also include those in which the measurement signal is recorded at one or more positions outside the area in which the saw blade engages in the workpiece. This permits indirect conclusions to be drawn concerning the actual position in the workpiece. Suitable measurement devices are known and are commercially available. Examples include eddy-current sensors, which can be used to record changes in distance between sensor and saw blade using induced currents. These changes in distance can then be converted into measurement signals. Magnetic sensors can be used, which record the strength of a magnetic field which changes with distance, for example by means of the resultant attraction forces. The magnetic sensors then convert this field strength into signals. It is also possible to use photo-optical or infrared-optical sensors. When selecting the appropriate measurement system, it is noted that the material to be cut can also affect the measurement.

However, the results achieved improve as the recording of the actual position of the saw blade using the measurement sensor becomes more accurate and more reliable.

In the course of the separating operation, the actual position determined may deviate from the desired position by more than a tolerance limit value. The tolerance limit value is established based on individual specifications of the wafers. Any deviation from the desired position is at least partially compensated for in the manner according to the invention, until the actual position has returned to within the permissible tolerance limit surrounding the desired position. The accuracy with which the predetermined tolerance limit is followed can be increased to such an extent that it is possible to maintain maximum deviations of about ±1 $\mu$m or less.

In one embodiment, the measurement value corresponding to the unimpeded movement of the saw blade which is measured before the freely rotating saw blade comes into contact with the workpiece is used as the starting value. This starting value may also serve as the basis for zero balancing, which is performed before each sawing cut, between the desired and actual positions.

In another embodiment, any deviation which is observed in the direction of wafer or bar can be at least partially compensated. This compensation occurs because the workpiece tracks this deviation by means of an identically directed movement until the actual position of the saw blade matches the desired position to the required level of accuracy. Translational movements of a few $\mu$m are generally sufficient for this tracking movement. This tracking movement can be executed only by actuators which allow sufficiently accurate control and are distinguished by a sufficiently dynamic adjustment performance. Examples of instruments useful for this purpose are those based on hydraulics, pneumatics, electric motors or mechanical equipment, as long as they allow the required highly accurate positioning. Piezoelectric drive units are preferably used, for reasons of the displacement resolution and movement speeds which can be achieved. For piezoelectric drive units, the translational movement can be effected and controlled by changing the voltage applied. Piezoelectric drive units are commercially available. They are positioned in such a way that they act on the workpiece mount, but do not affect the feed of the workpiece prior to each sawing operation.

In order for the adjustment between desired and actual values to take place correctly, the machine tool system which comprises sensor and rotating tool has to be calibrated. According to the method for calibration of the invention, it is now possible to check the machine-tools daily. If appropriate, it is possible to calibrate them by ascertaining a deviation at a predetermined rotational speed. Preferably, a second deviation is measured at a second rotational speed which differs from the first rotational speed.

Thus, in the event of a change in rotational speed, the distance between saw blade and displacement measurement sensor is changed. Preferably, in the case of an annular saw, a rotational speed of 1000 rpm and of 1500 rpm is measured and the respective deviations are determined.

Other objects and features of the present invention will become apparent from the following detailed description considered in connection with the accompanying example which discloses an embodiment of the present invention. It should be understood, however, that the example is designed for the purpose of illustration only and not as a definition of the limits of the invention.

DETAILED DESCRIPTION OF PREFERRED EMBODIMENTS

EXAMPLE

In a certain saw, a saw blade deviation of about 9 $\mu$m per 100 rpm is established, and in another specific saw a deviation of 3 $\mu$m per 100 rpm is established. If the measurement exceeds or falls below this value by a certain percentage, depending on the permissible tolerance limit, this value might preferably be 1% to 10%, and particularly preferably the value, in the case of an annular saw, lies in the region of 1 $\mu$m to 2 $\mu$m. This value is preferably measured using the displacement measurement sensor which is already present on the machine tool and measures without physical contact. This sensor is preferably an inductive-potentiometric, linearly inductive, optical, capacitive and preferably eddy-current-based sensor. This value is then compared with a predetermined deviation value in a computer, for the purpose of automatic calibration monitoring and calibration. If this value no longer corresponds to the deviation, it is clear that there is a mechanical and/or electrical fault in the machine tool system comprising saw blade and displacement measurement system. The fault, of mechanical and/or electrical nature, must be eliminated and then the displacement measurement system must be recalibrated.

The method according to the invention can be carried out at any time. Preferably, the calibration monitoring method of the invention is daily carried out automatically and can also be initiated manually at any time. If the test yields a negative result, the machine tool can be stopped automatically. A major advantage is that possible defects are recognized quickly and that the saw blade no longer has to be removed in order to carry out the test.

Daily automatic testing allows possible defects in the displacement measurement system to be recognized quickly. The result is a stable process sequence, improved geometry and a higher output. As a result of the calibration monitoring and calibration, which are possible at any time, the machine tool always operates correctly; whereas if testing were carried out once a month, problems would only have become apparent at a later time.

While a few embodiments of the present invention have been described, it is to be understood that many changes and modifications may be made thereunto without departing from the spirit and scope of the invention as defined in the appended claims.

What is claimed is:

1. A method for monitoring the calibration of and calibrating rotating tools which are liable to deviate comprising
   recording at least one known deviation at a first predetermined rotational speed; said one deviation being a measurement value which is then compared with a predetermined deviation value in a computer.

2. The method for monitoring the calibration of and calibrating rotating tools which are liable to deviate as claimed in claim 1, comprising
   recording at least one other known deviation at a second predetermined rotational speed which differs from the first rotational speed; said other deviation being a measurement value which is then compared with a predetermined deviation value in a computer.

3. The method for monitoring the calibration of and calibrating rotating tools which are liable to deviate as claimed in claim 2, wherein the recording is used to calibrate a device of which the rotating tool forms a part.

4. In a method for monitoring the calibration of and calibrating displacement measurement sensors which measure without physical contact,
   the improvement which comprises,
   utilizing the method of claim 2 for said monitoring and said calibrating.

5. The method for monitoring the calibration of and calibrating rotating tools which are liable to deviate as claimed in claim 1, wherein the recording is used to calibrate a device of which the rotating tool forms part.

6. In a method for monitoring the calibration of and calibrating displacement measurement sensors which measure without physical contact,
   the improvement which comprises
   utilizing the method of claim 1, for said monitoring and said calibrating.

* * * * *